UNITED STATES PATENT OFFICE.

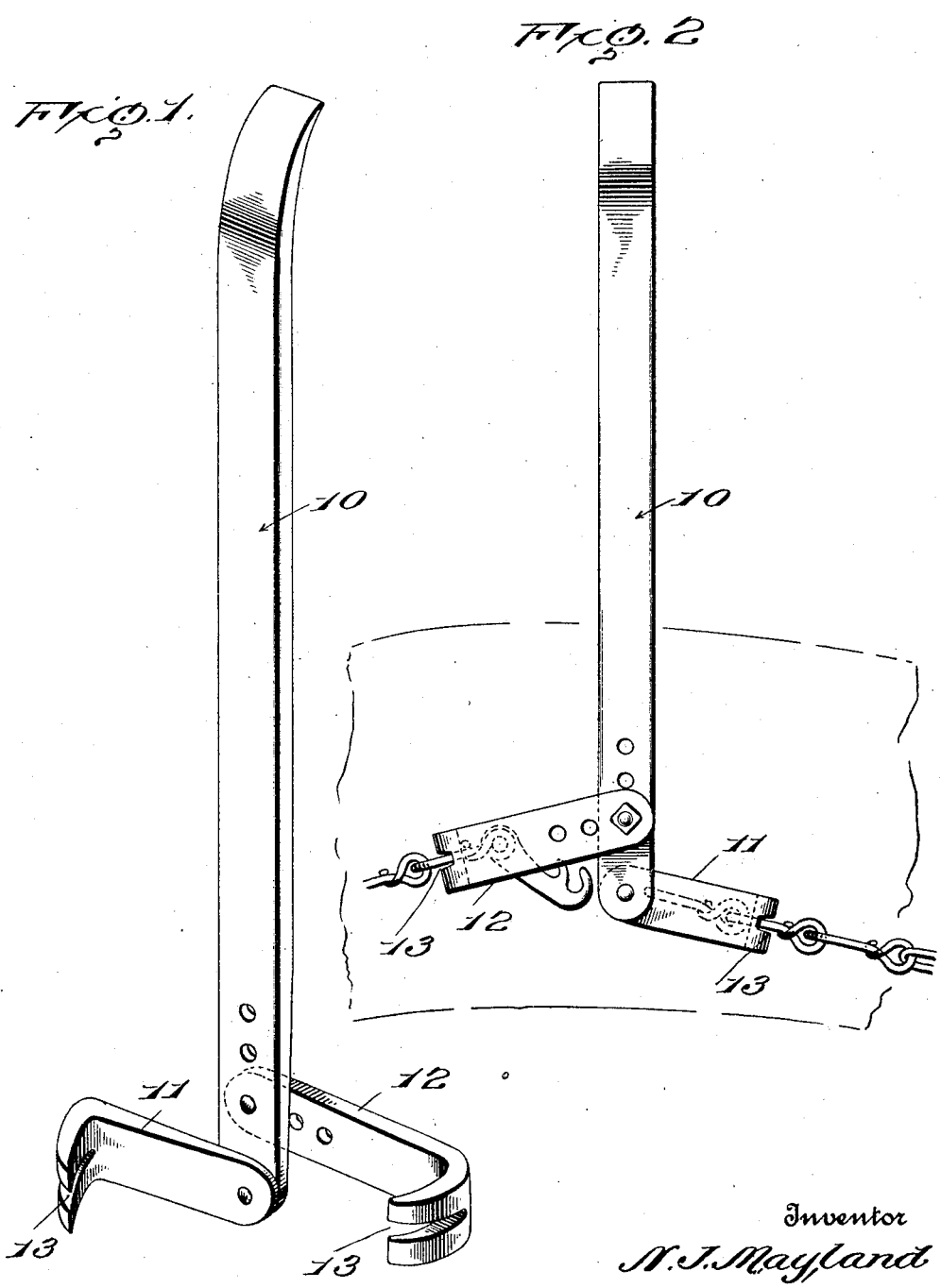

NIELS J. MAYLAND, OF NEWELL, IOWA.

ANTISKID-CHAIN TIGHTENER.

1,341,241.                Specification of Letters Patent.        Patented May 25, 1920.

Application filed May 22, 1919. Serial No. 299,086.

*To all whom it may concern:*

Be it known that I, NIELS J. MAYLAND, a citizen of the United States, residing at Newell, in the county of Buena Vista, State of Iowa, have invented certain new and useful Improvements in Antiskid-Chain Tighteners; and I do hereby declare the following to be a full, clear, and exact description of the invention, such as will enable others skilled in the art to which it appertains to make and use the same.

This invention relates to new and useful improvements in tighteners and particularly to devices for tightening anti-skid chains on automobile wheels.

One object of the present invention is to provide a novel and improved device of this character by means of which the ends of the anti-skid chain can be easily and effectively drawn together about the wheel.

Another object is to provide a novel and improved device of this character which is simple in construction and which is formed of few and cheap but strong parts.

Other objects and advatnages will be apparent from the following description when taken in connection with the accompanying drawing.

In the drawing:

Figure 1 is a perspective view of the chain tightener.

Fig. 2 is a side elevation of the device in operative connection with an anti-skid chain.

Referring particularly to the accompanying drawing, 10 represents a lever which is formed of flat metal and has a short member pivoted to one end thereof, as shown at 11. Inwardly of this member 11, and pivotally connected to the lever, is a second longer member 12. The outer end of each of these members 11 and 12 is bifurcated, as shown at 13, and the furcations turned at right angles to the plane of the member in a common direction therefrom.

In the use of the device the shorter member 11 extends in one direction from the lever while the longer member extends in the opposite direction. As seen in Fig. 2 the bifurcations of the members 11 and 12 are engaged with certain links at the ends of the side chains of the skid chain, and by rocking the lever 10 the members 11 and 12 will be moved to draw said chain ends together to the proper position to permit the hooks (not shown) to be engaged and the chains held in position on the wheel and tire.

Attention is particularly called to the fact that by the provision of the bifurcations at the ends of the members 11 and 12, it is possible to engage one of the links in each bifurcation so that the furcations bear against the end of the next adjacent link, or one of the furcations can be engaged through the eye of a link and the pulling accomplished with equal facility and effectiveness. Furthermore, the parts are formed in the minimum of number and the maximum of simplicity whereby the device can be manufactured at an extremely low cost and operated with the greatest facility.

What is claimed is:

1. A tool for tightening an anti-skid chain, comprising a lever, a pair of hooks having their stems pivoted at one end to the lever and at opposite sides thereof with parallel spaced pivots whereby to swing in parallel planes at opposite sides of the lever, the bill of the hooks extending in the same direction, each at right angles to the plane of pivotal movement of its hook, and being longitudinally slotted, whereby to provide spaced claws.

2. A tool for tightening an anti-skid chain, comprising a lever, a pair of hooks pivoted each at one end of its stem and at opposite sides of the lever at points spaced longitudinally of the latter, the bills at the other ends of the stems of the hooks extending in the same direction each at right angles to its plane of pivotal movement, the bill of each hook being slotted through its extremity in a plane, including the pivot of the hook.

In testimony whereof I affix my signature in the presence of two witnesses.

NIELS J. MAYLAND.

Witnesses:
C. CAPION,
GEO. W. CHANEY.